United States Patent [19]

Hodges

[11] 4,094,598
[45] June 13, 1978

[54] MICRO DISPLAY WITH MAGNIFIER

[76] Inventor: Dewey W. Hodges, 1502 S. Boulder, Tulsa, Okla. 74119

[21] Appl. No.: 761,237

[22] Filed: Jan. 21, 1977

[51] Int. Cl.² .................. G03B 21/14; G02B 27/02
[52] U.S. Cl. ............................... 353/76; 350/241; 353/101
[58] Field of Search ................... 353/39–41, 353/11–14, 76–78, 101; 350/251, 241, 247, 246, 256

[56] References Cited

U.S. PATENT DOCUMENTS

| | | | |
|---|---|---|---|
| 1,773,337 | 8/1930 | Barlow | 350/241 |
| 1,970,910 | 8/1934 | Aarnes | 350/251 |
| 2,054,697 | 9/1936 | Fiala | 350/241 |
| 2,513,072 | 6/1950 | Westenfelder | 353/12 |
| 3,822,088 | 7/1974 | Steiner | 350/251 |

Primary Examiner—Steven L. Stephan
Attorney, Agent, or Firm—Head, Johnson & Chafin

[57] ABSTRACT

An apparatus for displaying a magnified image having a console with a rear lighted projection screen, the console including a light source, a specimen holder, and a lens system for displaying a magnified image of the specimen on the rear surface of the screen, the console being arranged such that the screen is mounted for easy view by the user, the improvement including a magnifying glass supported by the console in front of the screen and variable in spacing with the screen for focusing by the user, the magnifying glass being movable over at least a significant portion of the screen so that the user can obtain a magnified view of selectable portions of the screen through the magnifying glass.

2 Claims, 5 Drawing Figures

U.S. Patent June 13, 1978 Sheet 1 of 2 4,094,598
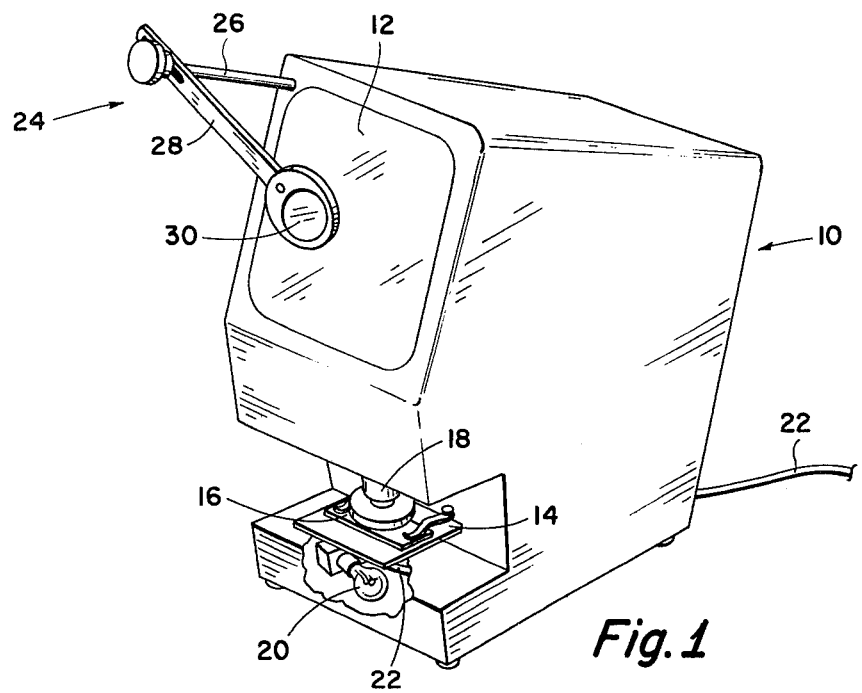
Fig. 1
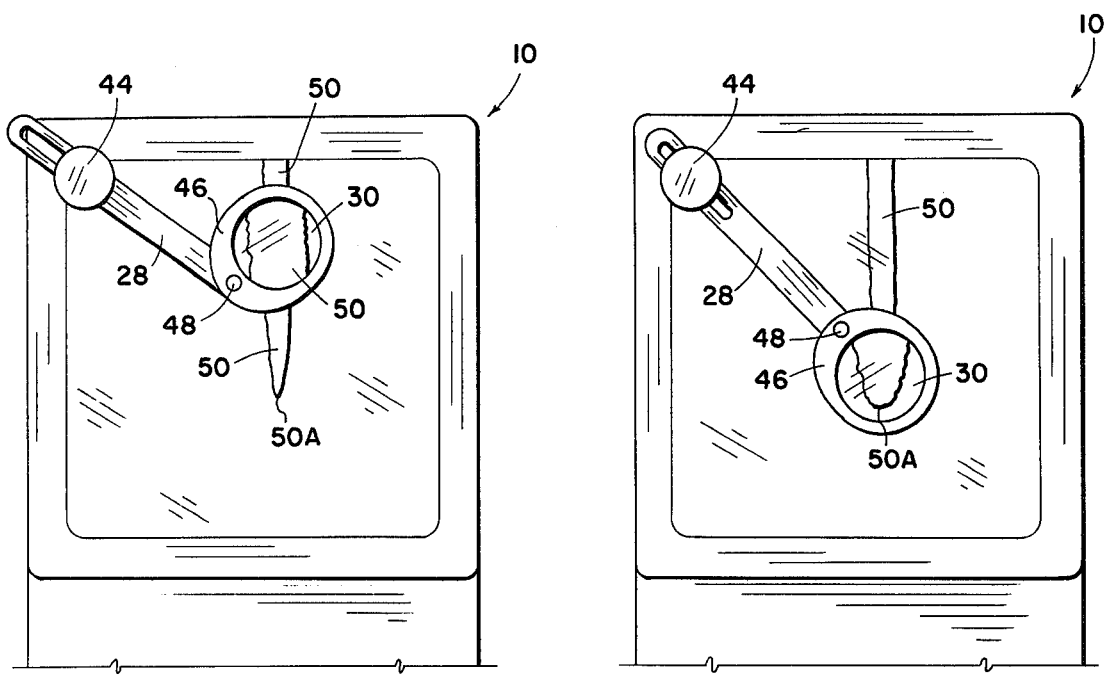
Fig. 4
Fig. 5

MICRO DISPLAY WITH MAGNIFIER

BACKGROUND AND OBJECTS OF THE INVENTION

For several years there has been available on the market an educational apparatus in the form of a console which enables the user, usually teachers and students, to project a magnified image on a screen. The console is in the form of a box usually mounted on a table or laboratory bench, the box including a specimen holder wherein a specimen, usually mounted on a glass slide, is positioned. A light source is positioned to direct light through the specimen and through a lens system, and mirrors for projecting the magnified image on the rear surface of a ground glass display screen. The user observes the magnified image from the front of the screen and the console is arranged to support the screen in a manner to make viewing convenient. The lens system usually includes means of adjusting the focusing as well as a means of varying magnification.

Devices of this type are commonly employed in science classes and schools for teaching students. While the devices are useful in many different applications, the most common usage is in teaching biology to display in portions of insects, amoeba and so forth.

The present invention is directed towards an improvement in the console having a black-lighted screen for displaying a magnified image by providing a magnifying glass positionable in front of the screen, that is, between the screen and the user, allowing the user to achieve additional magnification of a portion of the image projected on the screen.

It is therefore an object of this invention to provide an improved apparatus for displaying a magnified image.

More particularly, an object of this invention is to provide an improvement in a console having a rear lighted projection screen for displaying a magnified image thereon, the improvement being in the form of a magnifying glass supported in front of the screen and adjustable by the user to vary the focus of the magnifying glass relative to the screen and also to vary the position of the magnifying glass so that various portions of the image displayed by the screen can be magnified.

These, as well as other and more specific objects of the invention will be fulfilled in the following description and claims, taken in conjunction with the attached drawings.

DESCRIPTION OF VIEWS

FIG. 1 is an isometric view of a console having a rear lighted projection screen and having the improvements of this invention providing a magnifying glass which affords an enlarged view of a portion of the image projected on the screen.

FIG. 4 is a view of the screen showing an enlarged view of portion of a pin projected on the screen and showing how the magnifying glass may be utilized to enlarge a portion of the projected image.

FIG. 5 shows a view as in FIG. 4 but showing the manner in which the position of the magnifying lens may be varied by the user to examine in greater detail other portions of the image projected on the screen.

SUMMARY OF THE INVENTION

Figure 3:
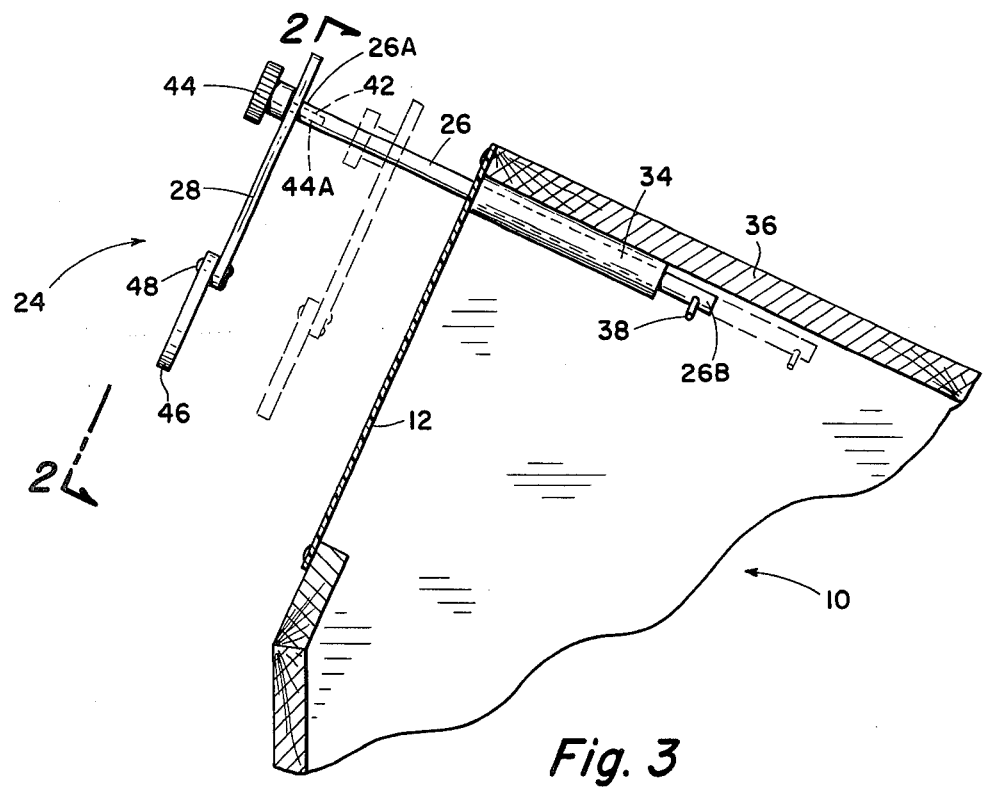
FIG. 3 is a fragmentary cross-sectional view taken along the line 3—3 of FIG. 2 showing one manner in which the apparatus of this invention may be constructed.

An apparatus for displaying a magnified image having a console with a rear lighted ground glass projection screen and including a light source, a specimen holder, and a lens system for displaying a magnified image of the specimen on the rear surface of the screen so that the user can perceive the magnified image by observing the front surface of the screen and including the improvement of a magnifying glass supported by the console in spaced relationship in front of the screen and movable over at least a significant portion of the screen so that the user can obtain a magnified view of a portion of the image projected on the screen.

DETAILED DESCRIPTION

Referring to the drawings and first to FIG. 1 a display console is generally indicated by the numeral 10. The console 10 is of the type commercially available and is used for many purposes but most typically as an instruction aid in science and biology classes of junior high, high school and colleges. The console 10 normally is placed on a table or laboratory bench and includes a screen 12 which typically is formed of ground glass. A magnified image is projected onto the rear surface of the screen. The console includes a specimen holder 14 adapted for positioning a specimen to be magnified, usually placed on a glass slide 16. The glass slide 16 may be moved around so that various portions of the image being magnified are projected onto screen 12. The console includes a lens system 18 combined with a mirror system (not shown) to magnify and direct the image of the specimen onto the rear surface of the screen 12. The console is cut away to illustrate a light source 20 normally formed of a high intensity light bulb energized from electrical source supplied by cord 22. A light passes through the specimen on glass slide 16, is magnified and projected onto the rear surface of screen 12. The lens system 18 includes means for focusing the image projected on the rear surface of screen 12 and normally includes interchangeable lenses so that the degree of magnification may also be varied.

The device described up to this point is of a commercially available product. The invention is the improvement to the device which enables the user to obtain a magnified view of a portion of the image projected on screen 12. The image magnifier is generally indicated by the numeral 24 and includes a support rod 26 extending perpendicular to the plane of screen 12 and from a point on the console 10 adjacent to the edge of the screen. An arm 28 extends from the outer end of the support rod and parallel to the screen 12. A magnifying lens 30 is affixed to the outer end of the arm.

The support rod 26 may be mounted in a variety of ways to the console, however, FIG. 3 shows one arrangement. A tubular member 34 is attached to the interior of console housing 36 and slidably received the support rod 26. A pin 38 at the inner end prevents the support rod 26 from being inadvertently fully withdrawn from tubular member 34. The means of mouting the support rod 26 may vary considerably and the illustrated arrangement is by the way of example only.

Arm 28 typically includes an elongated slot 40 (see FIG. 2) adjacent the first end. The outer end 26A of the support rod has a threaded opening 42 which receives the reduced diameter threaded portion 44A of a thumbscrew 44. The threaded portion 44A extends through the slot 40 and allows the length of the arm 28 to be adjusted so that the magnifying glass 30 may be positioned over various areas of screen 12.

Figure 2:
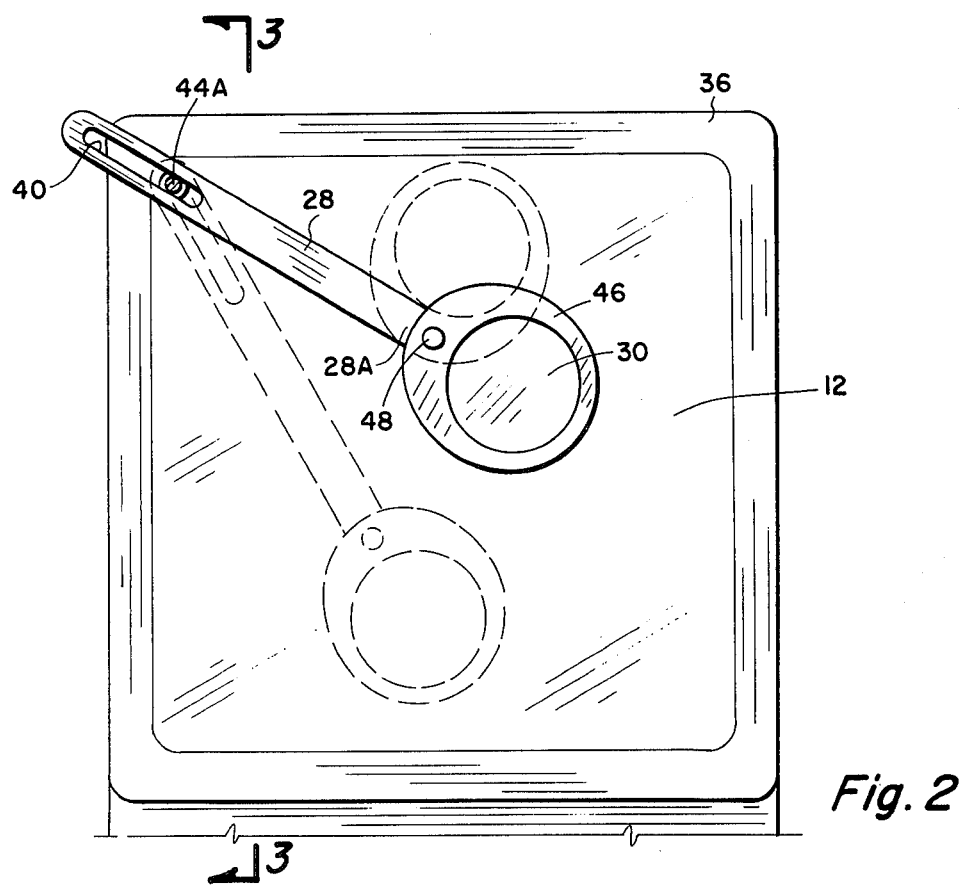
FIG. 2 is an enlarged elevational view of the screen portion of the console showing various positions which may be attained by the magnifying glass to enable the user to obtain an enlarged view of selected portions of the image displayed on the screen.

Magnifying glass 30 includes a housing 46 which is supported to the outer end 28A of arm 28 by a pivot pin 48. This pivotal relationship allows the magnifying glass 30 to be moved over various portions of screen 12. Thus by including a variable length arm 28 which may be positioned at various angles over the screen 12 and a pivotally mounted housing 46 for the magnifying glass 30 the user can easily and expeditiously position the magnifying glass 30 to various points over the screen 12 to obtain an enlarged view of the image projected on the screen. FIG. 2 shows how the position of the magnifying glass 30 may be varied relative to screen 12. It can be seen that the length of arm 28 may be increased and slot 40 could be longer so that the magnifying glass 30 could be arranged to extend over all portions of the screen 12. This is not normally necessary since the user can adjust the image of the specimen projected on the screen by moving the specimen slide 16 and therefore it is, from a practical standpoint, only necessary that means be provided for adjusting the position of the magnifying lens 30 over a major portion of the center part of the screen 12.

The focusing of magnifying lens 30 is accomplished by moving the support rod 26 in and out relative to the screen.

FIGS. 4 and 5 illustrate how the magnifier is used. Shown projected on screen 12 is, as an example, the end of a pin or needle 50. In FIG. 4 the magnifying glass 30 is positioned to provide an enlarged image of the view projected on the screen 12 of a portion of the pin near the end. By moving the magnifying lens 30 as shown in FIG. 5, the user can obtain an enlarged view of the point 58 of the pin 50.

The apparatus described fulfills all of the objectives initially set forth. It provides an easily adjusted and focused magnifying lens forming a part of a console having means for projecting an enlarged image of a specimen onto the rear surface of a viewing screen. The device enables the user to gain increased utilization of a commercially available magnifying device. It can be seen that by removing thumbscrew 44 the magnifier, including arm 28 and magnifying lens 30, may be used as a separate item and held by the hand for observing a portion of screen 12 or used in other ways for educational purposes, such as examining the leaf of a plant or the like. The device including the magnifying lens 30 and arm 28 may be used by students on field trips. The exact construction of the magnifying device may vary considerably. The configuration of the housing 46, arm 28, and support rod 26 may be different, as well as the means of supporting rod 26 to the console housing, all without departing from the spirit and scope of this disclosure. It is understood that the invention is not limited to the embodiment set forth herein for purposes of exemplification, but is to be limited only by the scope of the attached claim or claims, inclduing the full range of equivalency to which each element thereof is entitled.

What is claimed is:

1. An improved apparatus for displaying a magnified image comprising:

a console having a rear lighted projection screen, a light source, a specimen holder, and a lens system for displaying a magnified image of the specimen on the rear surface of the projection screen, the screen being mounted for easy view of the user;

a support rod slidably and rotatably extending from said console perpendicular to said screen and adjacent one edge of said screen, the length of the support rod extending from said console being slidably variable, the outer end of the support rod having threaded means;

an arm having a slot at its inner end and being affixed to the outer end of said support rod by said threaded means being received in the slot, the arm extending parallel to and spaced from said screen, the length of said arm from said support rod being varible by reason of the threaded means being slidabe in the slot; and a magnifying glass pivotally supported at one edge to the outer end of said arm by a pin extending perpendicular the plane of said screen, the magnifying glass being supported parallel said console screen and movable over at least a substantial portion of said screen and variably spaced from said screen by the sliding action of said support rod to permit focusing on said screen.

2. Apparatus according to claim 1 wherein said threaded means attaching said slotted inner end of said arm to said rod is in the form of a thumb screw whereby said arm with said magnifying glass may be readily removed.

* * * * *